(12) United States Patent
    Goldie

(10) Patent No.: US 7,057,172 B2
(45) Date of Patent: Jun. 6, 2006

(54) PARTICLE DETECTOR ASSEMBLY

(75) Inventor: David John Goldie, Oxon (GB)

(73) Assignee: Oxford Instruments Superconductivity LTD, Oxon (GB)

( * ) Notice: Subject to any disclaimer, the term of this patent is extended or adjusted under 35 U.S.C. 154(b) by 97 days.

(21) Appl. No.: 10/384,773

(22) Filed: Mar. 11, 2003

(65) Prior Publication Data

US 2003/0178567 A1    Sep. 25, 2003

(30) Foreign Application Priority Data

Mar. 11, 2002  (GB) .............................. 0205662.0

(51) Int. Cl.
    *G01T 7/00*    (2006.01)

(52) U.S. Cl. ................................. 250/336.2
(58) Field of Classification Search ............. 250/336.2; 257/39, 30, 32, 36, 429
    See application file for complete search history.

(56) References Cited

U.S. PATENT DOCUMENTS 5,381,001 A *  1/1995  Perryman et al. ........ 250/214.1
6,365,912 B1 *  4/2002  Booth et al. .................. 257/39

OTHER PUBLICATIONS

G. Angholer et al., Journal of Applied Physics, Jan. 15, 2001, vol. 89 No. 2, p. 1425.*
H. Kraus, et al., "Quasiparticle Trapping in a Superconductive Detector System Exhibiting High Energy and Position Resolution", vol. 231, No. 1.2, Physics Letters B, Nov. 2, 1989, pp. 195-202.
Norman E. Booth et al., Topical Review, Superconducting particle detectors, Supercond. Sci. Technol 9 (1996), pp. 493-516.
M.C. Gaidis et al., Superconducting Nb-Ta-Al-Al-AlOx-Al Tunnel Junctions for X-Ray Detection, Journal of Low Temperature Physics, vol. 93, Nos. 314, 1993, pp. 605-610.
A. Poelaert, et al., The suppression of phonon induced noise in niobium superconducting tunnel junction x-ray detectors, J. Appl. Phys. 79 (5), Mar. 1, 1996, pp. 2574-2579.
G. Angloher et al., Energy resolution of 12 eV at 5.9 keV from Al- superconducting tunnel junction detectors, Journal of Applied Physics, vol. 89, No. 2, Jan. 15, 2001, pp. 1425-1429.

* cited by examiner

*Primary Examiner*—David Porta
*Assistant Examiner*—Marcus Taningco
(74) *Attorney, Agent, or Firm*—Staas & Halsey LLP

(57) ABSTRACT

A particle detector assembly includes a substrate on which are mounted at least two superconducting quasiparticle detectors. A processing system is connected to the detectors and distinguishes between events detected simultaneously in each detector and non-simultaneous events.

9 Claims, 5 Drawing Sheets

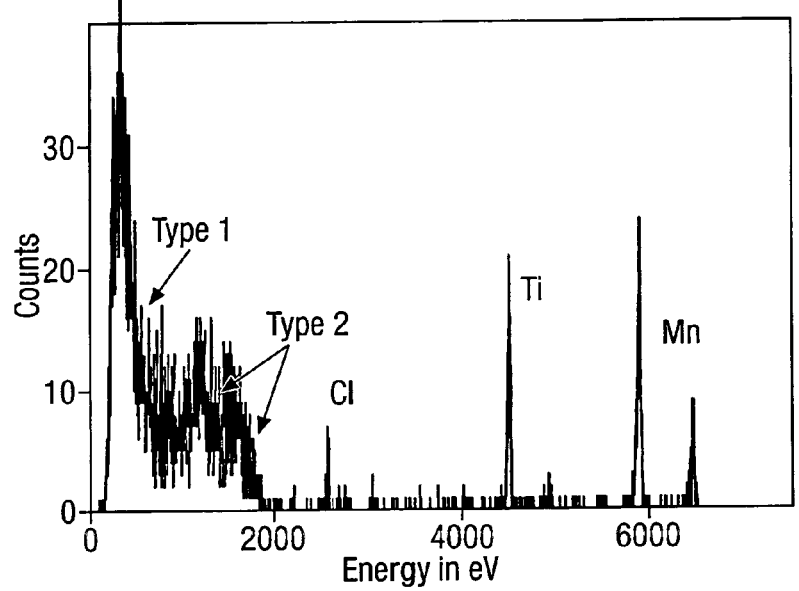
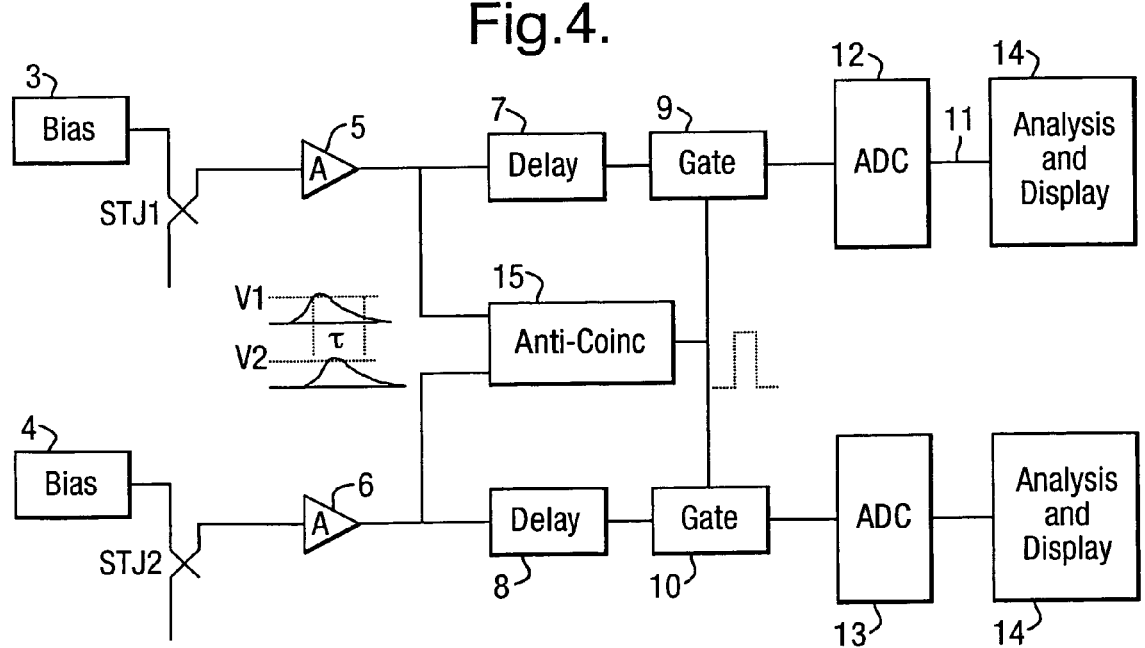

PARTICLE DETECTOR ASSEMBLY

FIELD OF THE INVENTION

The invention relates to a particle detector assembly based on quasiparticle sensor technology such as a superconducting tunnel junction.

BACKGROUND TO THE INVENTION

Superconducting tunnel junctions (STJs) are used for detecting individual particles such as photons. Examples are described in "Quasiparticle trapping in a superconductive detector system exhibiting high energy and position resolution", Kraus et al, Physics Letters B, Vol. 231, No. 1,2, November 1989, pages 195–202; and "Superconducting particle detectors", Booth and Goldie, Supercond. Sci. Technol. 9 (1996) 493–516.

Superconducting quasiparticle sensors such as STJs are typically fabricated on substrates and a problem can arise when incident photons or other particles such as neutrons, muons, ions or molecules of sufficient energy interact with the substrate to produce "substrate events" which modify the detected response.

The presence of substrate events in the detector response has always been recognised as a serious source of spectral contamination for thin-film low temperature detectors. In general, the volumes of the sensing elements of these detectors are limited by technological constraints (such as the difficulty of processing thick films) or application requirements (such as energy resolution or counting rate). A compromise is often required so that the detectors have less than unity quantum efficiency. This means that some fraction of the incident particle (photon) flux always interacts in the supporting structure of the detector. Even for a very thick detector, products of natural radioactivity or cosmic rays will generate spurious pulses due to interactions in the substrate. Some devices, particularly transition edge sensors, utilise thin membrane-type support structures for which interactions in the substrate are relatively rare. Measurements still indicate a low level of substrate artefacts from these interactions. Most STJ detectors are fabricated on thick, crystalline dielectrics. These allow the fabrication, for example, of epitaxial films giving increased quasiparticle diffusion coefficients as compared with disordered polycrystalline films, and hence increased detector count-rates and energy resolution. Fabrication on a robust substrate also permits high packing-densities for arrays of sensors.

The photons whose energies are to be determined by the detector are absorbed exponentially as a function of thickness. This means that for finite absorber thicknesses some fraction of the incident photon flux must pass through the detector and interact in the supporting structure. Some fraction of this absorbed energy is then able to couple back into the detector. The ultimately detected energy is inevitably less than the full energy of the incident photons so that the spectrum of detected energies shows artefacts that are unwanted and these make detection of broad-band incident photons with good energy resolution difficult.

A number of schemes have been proposed previously to reduce this source of spectral artefact. These schemes include deposition of one or more thin layers between the substrate and the superconductor, (see M C Gaidis et al, "Superconducting Nb—Ta—Al—AlOx-Al tunnel junctions for X-ray detection", J. Low Temp. Phys. 93, 605 (1993) and A Poelaert at, "The suppression of phonon induced noise in niobium superconducting tunnel junction detectors", J. Appl. Phys. 79, 2574 (1996)), or even deposition of a thin normal-metal layer between the absorber and the substrate (see G Angholer et al, "Energy resolution of 12 eV at 5.9 keV from Al-superconducting tunnel junction detectors", J. Appl. Phys. 89, 1425 (2001)). Although the latter approach is attractive, any benefit of film epitaxy is lost and an additional insulating layer is required to electrically isolate the superconductor from the normal-metal phonon barrier. Interactions will still inevitably occur in this electrical isolation layer.

SUMMARY OF THE INVENTION

In accordance with a first aspect of the present invention, a particle detector assembly comprises a substrate on which are mounted at least two superconducting quasiparticle detectors; and a processing system connected to the detectors and adapted to distinguish between events detected substantially simultaneously in each detector and non-simultaneous events.

As will be explained in more detail below, we have recognised that it is possible to eliminate substrate events by the use of two or more quasiparticle detectors and looking for events which are not simultaneously detected in each detector.

Preferably the quasiparticle detector are STJs and, although the method described below assumes that the detectors are STJs, the approach is applicable to any superconducting detector where the required signal is generated by the detection of quasiparticles and the background is coupled by phonons produced in a supporting substrate. As in the cases described, the efficiency of the rejection scheme is enhanced if the quasiparticle detector is itself coupled to a larger superconducting absorber.

For superconducting sensors such as STJ detectors fabricated on crystalline dielectrics, photons interacting by scattering from electrons in the superconductor produce a high-energy primary electronic excitation that transfers its excess energy amongst the electronic and phonon subsystems on a time-scale of order a few ns. This energy down-conversion produces large numbers of low-energy quasiparticle excitations, with lifetimes of tens of microseconds. These quasiparticles generate the electrical signal and are ultimtely lost as they recombine to Cooper pairs. Phonons are also produced whose energies are below the pair-breaking threshold of the superconducting state. These phonons are lost from the detector.

Interactions in the substrate have different characteristics. Although the initial interaction is between the photon and atomic electrons, the ultimate energy down-conversion occurs exclusively into the phonon system. In the absence of conduction electrons, these phonons can have long decay times, dependent inversely on energy. For phonons capable of breaking pairs in the superconductor, i.e. $\Omega=1.2$ meV for Ta, the lifetimes are long and of order tens of microseconds or more depending on the phonon branch. The phonon spectrum in the dielectric remains non-thermal for considerable lengths of time. Phonons above the pair-breaking threshold are capable of being detected by the STJ although the amount of energy detected depends on solid angles for detection and details of the loss mechanisms.

We have realised that the long lifetimes of the phonons in the substrate at the detector threshold means that substrate events will show coincident pulses in two or more separate read-out STJs. Measurements show that real full-energy events in a STJ show no measurable signal in an adjacent STJ. This suggests that the quasiparticle loss mechanism in the STJ arises primarily from single quasiparticle losses that generate sub-threshold phonons of energy ($\Omega^-\Delta$). Using two or more STJs means that the substrate events can be rejected by operating the detectors in anti-coincidence. Since the characteristic coincident time for the substrate events is short, the effect on the detector counting rate is negligible.

Preferably a particle absorber is provided on the substrate between and around the detectors and is one of gold, bismuth, normal metal, an alloy, or a superconductor of lower superconducting energy gap than that of the superconducting quasiparticle detectors. In addition the particle absorber is preferably coated with a thin reflective metal layer to preferentially reflect incident photons.

The processing system itself typically comprises respective amplifiers connected to the outputs of each detector, the outputs of the amplifiers being fed in parallel to a coincidence detecting circuit and to a processor via respective gates, the coincidence detecting circuit operating the gates to prevent pulses being supplied to the processor if the pulses are detected substantially simultaneously. It may also further comprise a means of signal amplification connected to the outputs of each detector, the outputs of the amplifiers being coupled to a digital signal processing unit whereby coincident pulse are rejected using digital programmes.

The efficiency of the rejection mechanism and the energy threshold down to which it functions are improved as the STJ detector area is increased.

Thus, in accordance with a second aspect of the invention, we provide a particle detector assembly comprising a substrate on which are mounted at least two superconducting absorbers each having two or more superconducting quasiparticle detectors in order to enhance the detection sensitivity by maximising the detector area. Preferably the assembly further comprises a processing system connected to the detectors and adapted to distinguish between events detected substantially simultaneously in the detectors of different absorbers and non-simultaneous events.

Increasing the area increases the solid angle for detection of the substrate phonons which in turn increases the energy sensitivity and hence reduces the threshold. Such large area detectors may be achieved using a distributed read-out scheme where two or more detectors such as STJs read out a separate superconducting film. In this case, the individual absorbing-film events are characterized by co-incident pulses in the read-out STJs for that particular absorbing-film, substrate events are characterized by co-incident events detected in two (or more) absorbing films.

BRIEF DESCRIPTION OF THE DRAWINGS

Some examples of particle detector assemblies according to the invention will now be described with reference to the accompanying drawings, in which:

FIG. 1 shows a typical spectrum of events sensed in a STJ detector;

FIG. 4 is a block diagram showing an example of a circuit for a detector according to the invention;

DETAILED DESCRIPTION

Figure 5:
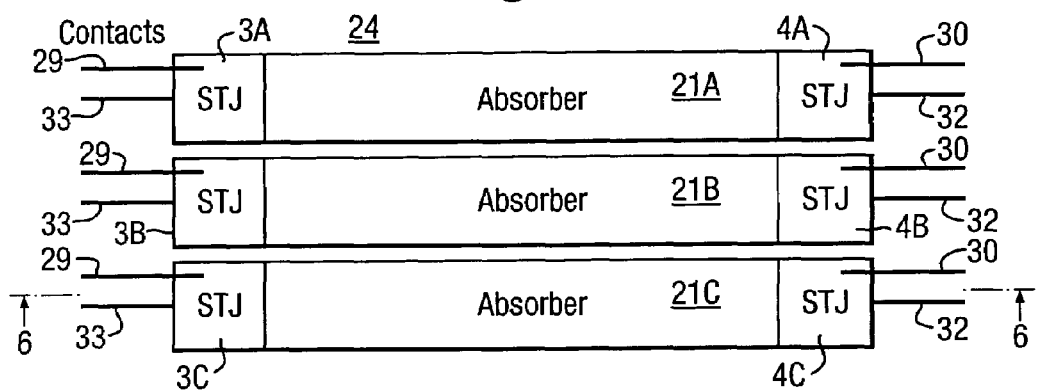
FIG. 5 is a plan of a first example of the detector assembly.

FIG. 5 illustrates a first example of a detector assembly which comprises a set of three Ta absorbers 21A–21C at the end of which are mounted respective STJ detectors 3A–3C; 4A–4C. Each assembly is mounted on a common substrate 24 of sapphire.

Figure 6:
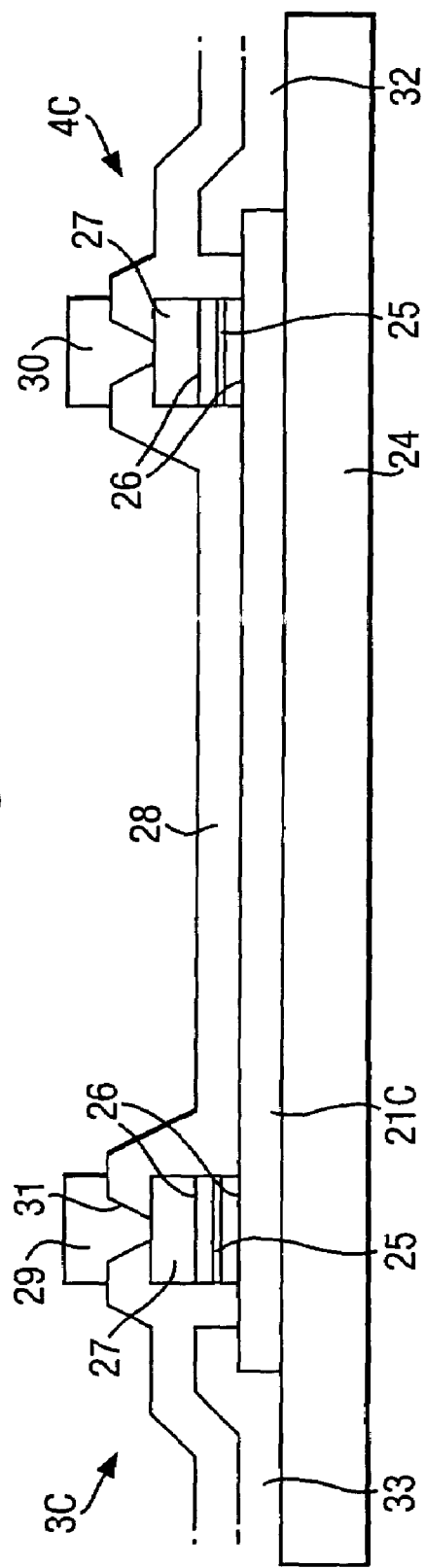
FIG. 6 is a cross-section on the line 6—6 in FIG. 5.

The structure of one of the absorbers/STJ assemblies is shown in more detail in FIG. 6.

As can be seen in FIG. 6 the Ta absorber 21C is provided on a sapphire substrate 24. Each STJ device 3C, 4C comprises an insulating barrier 25, such as AlO sandwiched between a pair of quasi particle traps 26, typically aluminum having a thickness of 65 nm. A Ta top electrode 27 is located above the upper trap 26 and this structure is coated with an insulating layer 28 of, for example, $SiO_x$.5 Respective top contacts 29,30 make electrical contact with the respective top electrodes 27 via holes 31 in the insulating layer 28. Base electrodes 32,33, typically Niobium, contact the absorber 21C.

FIG. 1 shows a typical spectrum of events sensed in a STJ detector mounted on a Tantalum absorber with a thickness of 400 nm. The detector of 350 nm thickness is irradiated by a multi-line X-ray fluorescence source that emits photons at principal energies 2622, 4508, 4932, 5895, and 6400 eV. The absorber quantum efficiencies are calculated to be 77%, 33%, 27.5%, 18.5%, and 15% respectively at these energies.

Besides the full-energy peaks, two types of substrate events are indicated; referred to as Type 1 and Type 2.

Type 1 events are due to interactions of photons in the substrate 24 in regions laterally spaced from the STJs 3A–3C, 4A–4C and give a broad spread of detected energies up to about 10% of the incident full energy. Measurements indicate that the phonon mean-free paths in the substrate are sufficiently long to give measurable signals for distance in excess of 2 mm.

Figure 7:
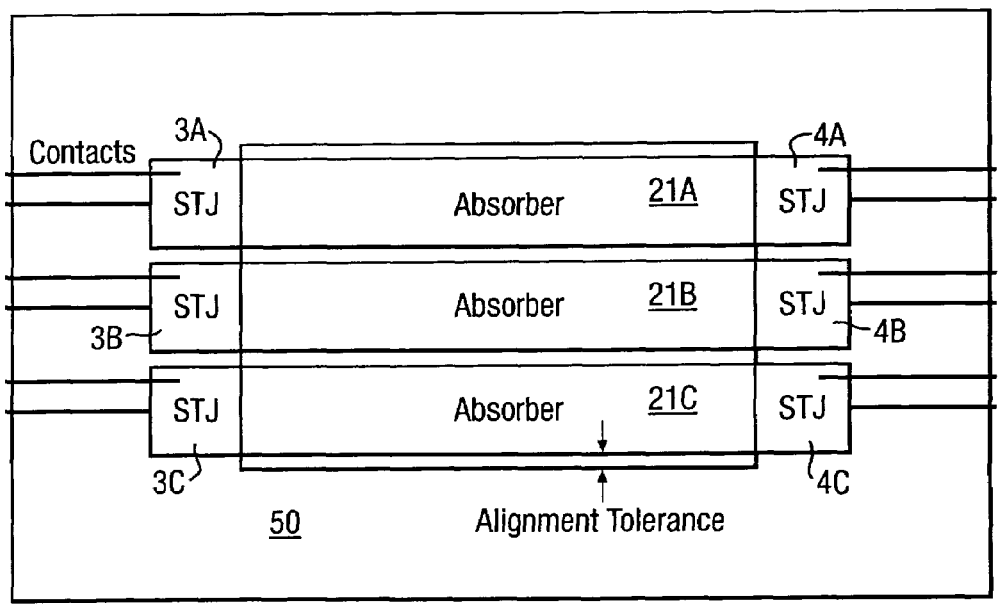
FIG. 7 is a plan of a second example of the detector assembly.

On-chip collimation reduces this contribution significantly but will not eliminate it. In this the substrate or chip 24 is coated with an absorber 50 such as gold, bismuth, a normal metal or alloy, optionally with an overlying reflector such as aluminium to prevent particles (photons in this example) reaching the chip. An on-chip collimator is indicated in FIG. 7 (shaded region). An additional insulating layer of, for example $SiO_x$, is required to insulate the top contacts from the on-chip collimator.

Type 2 events are caused by interactions of photons in the substrate directly below a STJ and are the most troublesome, intrinsic to any film, and deposit energy in the detector up to an energy of about 27% of the incident full energy. This spectrum produces a shoulder at about 20% of full energy tailing-off at lower energies due to the exponential absorption of the photons in the substrate and merging into the general substrate contribution. FIG. 1 shows a pulse height spectrum and indicates the Type 2 events due to both Mn and Ti K$\alpha$ radiation.

We now consider the detection of events in a pair of STJ detectors (for example 3A,3B), the STJ detectors in this example each comprising an array of STJ devices connected in parallel.

Figure 2:
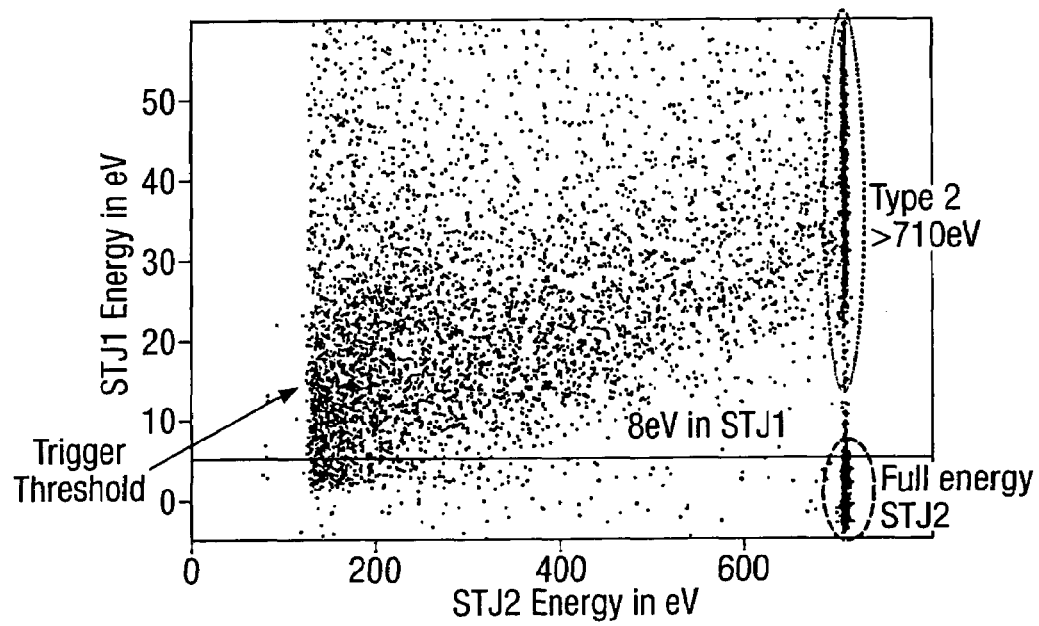
FIG. 2 shows the coincident charge pulse data obtained from two STJs on the same substrate.

These measurements use adjacent but electrically isolated detectors. Data has been obtained for coincident measurements between devices denoted by STJ1 and STJ2 and where the STJs are side-by-side but electrically isolated. The plot (FIG. 2) shows measured charge in both detectors. Limitations of the digital processing trigger system mean that the largest full energy pulses in STJ2 are off-scale in this data and are grouped at 710 eV.

For the low energy events in STJ2, (i.e. below 710 eV in this plot), nearly all of the pulses have a measurable, coincident pulse in STJ1. The plot shows that there is a small class of events of large amplitude where coincident pulses in the second detector (STJ2) are consistent with zero detected energy and definitely less than about 8 eV in this case in the first detector STJ1. These represent the genuine full energy events in STJ2.

Figure 3:
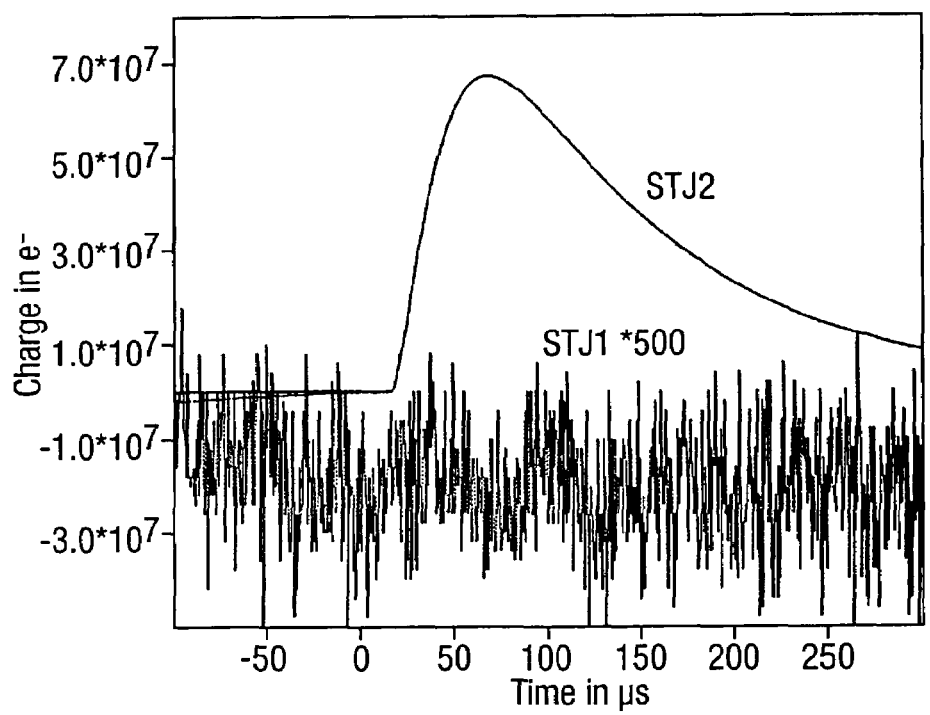
FIG. 3 illustrates a non-coincident pulse being detected.

FIG. 3 shows coincident charge pulses measured for STJ2 and STJ1. The scale for STJ1 is multiplied by 500. A full energy event in STJ2 shows no measurable pulse in STJ1.

A very simple method to reject the phonon-coupled substrate events is now possible based on an energy threshold cut with anti-coincidence between two or more detectors. Data analysis shows that 95% of all substrate events detected in one detector show more than the threshold energy detected in the adjacent device. Some low energy phonon-coupled events remain below the energy cutoff. These only contribute to the spectrum below about 200 eV (i.e. 3% of the maximum incident photon energy).

The characteristic time for the anti-coincidence is determined by the phonon velocity in the substrate. This time is shorter than the time required for the detected quasiparticle pulse to return to baseline. The longer of these times determines the achievable count rate in each detector. For a baseline return time of 300 µs a maximum count-rate of about 1200 Hz is calculated. Anti coincidence with a time window of lops 10 µs reduces this rate by less than 1.5%. Using more than two detectors makes rejection of random coincidences even less of a problem. Substrate events are mimicked by random coincidences in all of the detectors.

An example of a circuit for use with two separate STJs on a common substrate such as 3A and 3B is illustrated in FIG. 4. Detectors STJ1 and STJ2 are connected to a bias source (voltage or current) 3, 4 respectively. Output signals from each STJ (3A, 3B) are fed to respective amplifiers 5, 6 such as FET or SQUIDs. Voltage pulses from the outputs of each amplifier 5,6 are routed through a respective delay circuit 7,8 and gate 9,10 to a processing system 11. The processing system 11 is a conventional digital processing system including respective analogue-to-digital converters 12,13 and analysis and display systems 14 where the pulse amplitudes and hence energy are determined.

The outputs from each amplifier 5,6 are also fed to an anti-coincident circuit 15 which generates a logic pulse that closes each gate 9,10 if there exist pulses at both of the inputs to the circuit 15 whose amplitudes exceed preset threshold values $V_1, V_2$ within a coincidence time T. $V_1, V_2$ are preferably set separately near the noise level of each amplifier output. If the gates 9,10 are closed, the pulses are not counted and thus both type 1 and type 2 events are excluded.

Typically, the functions of the anti-coincidence circuit would be generated entirely within the analysis and display software by using the trigger system of each analysis chain and a common system time-stamp to determine the coincidence time. The trigger system is necessary to determine that pulses are present for processing.

For n channels there are simply n sets of bias, amplification, delay, gate and analysis, and a single anti-coincidence with n inputs. The condition to close the gates rejecting the pulses present, is that all n inputs have pulses present, above their individual thresholds, within the coincidence time.

Figure 8:
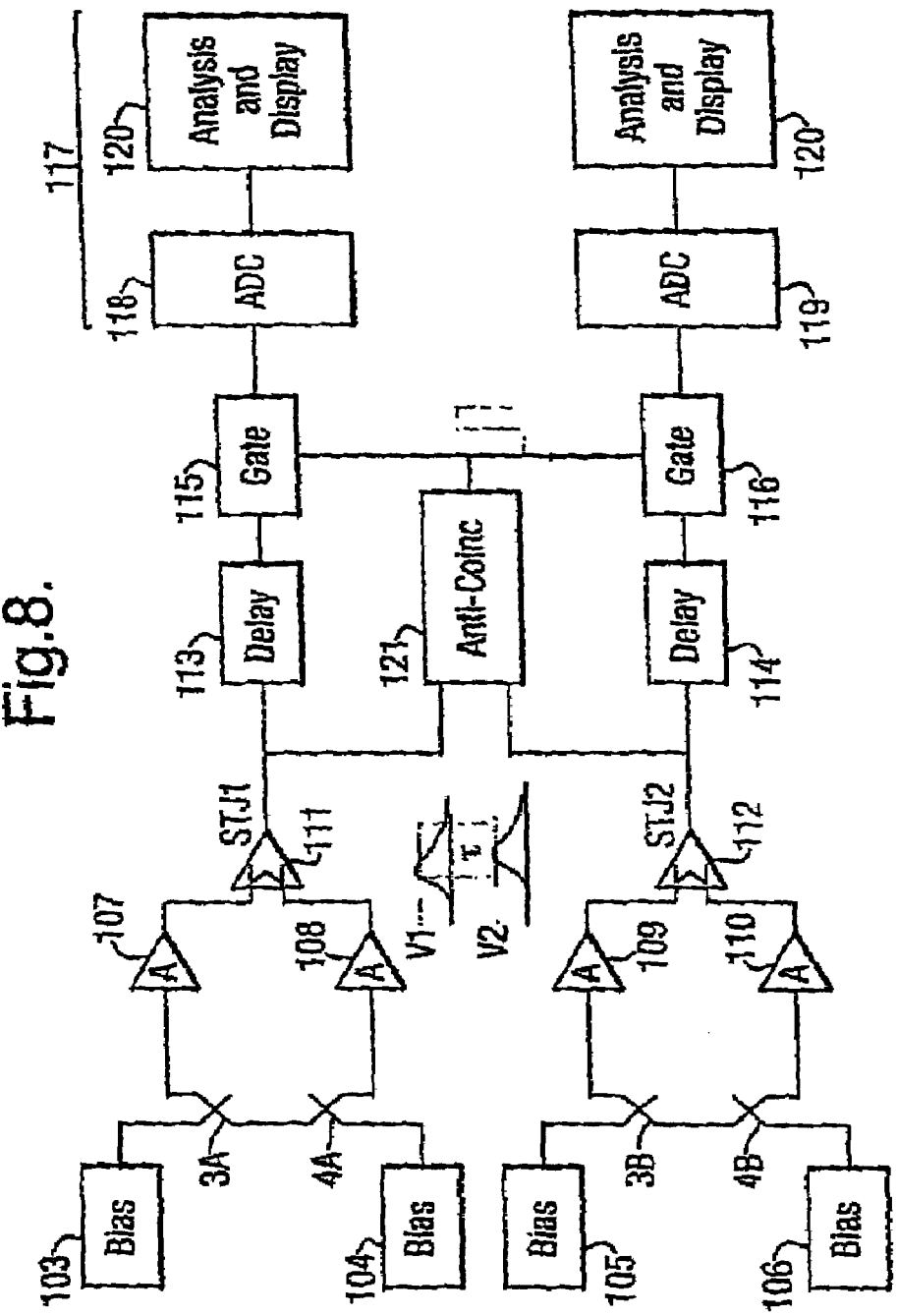
FIG. 8 is a block diagram showing an example of a circuit for a detector assembly according to the examples of FIGS. 5 and 7.

An example of a circuit for use with one of the assemblies 3A, 4A, 21A and 3B, 4B 21B illustrated in FIGS. 5, 6 and 7, is illustrated in FIG. 8. For each assembly the sum of the signals detected by 3A and 4A or by 3B and 4B represents substantially the total energy detected by the respective assemblies 21A, 21B. The respective sums now correspond to the signals STJ1, STJ2 in the foregoing discussion. Each STJ3A, 4A, 3B, 4B is connected to a bias supply 103, 104, 105, 106 respectively. Output signals are fed to respective amplifiers 107, 108, 109, 110 such as FET or SQUIDs. Voltage pulses from 3A and 4A generated by amplifiers 107 and 108 are summed with a summing amplifier 111 Voltage pulses from 3B and 4B generated by amplifiers 109 and 110 are summed with a summing amplifier 112. Summed signals are routed through respective delay circuit 113, 114 and gate 115, 116. Processing system 117 is a conventional digital pulse processing system including respective analogue to digital converters 118, 119 and analysis and display 120.

Outputs of the summing amplifiers 111, 112 are also fed to an anti-coincident circuit 121 which generates a logic pulse that closes gates 115, 116 if there exist pulses at both inputs that exceed pre-set trigger levels V1, V2, within a pre-set coincidence time t. In an alternative embodiment signals from amplifiers 107, 108, 109, 110 may be directly routed to the anti-coincidence circuit 121. In another alternative, separate gates may be used for each of the signals from amplifiers 107, 108, 109, 110 and controlled by a common anticoincidence unit.

Typically the functions of the summing amplifiers and the anti-coincidence circuit would be performed within the analysis and display software using the trigger system of each analysis chain. This triggering system may then use signals derived from either amplifiers 107, 108, 109, 110 directly or their sums 111, 112. Use of software for this analysis also permits refinement of the summing algorithm to account, for example, for position dependence of the measured signals 107, 108, 109, 110 from each absorber.

I claim:

1. A particle detector assembly comprising:
   a substrate on which are mounted at least two superconducting quasiparticle detectors; and
   a processing system connected to the detectors and which distinquishes between events detected substantially simultaneously in each detector and non-simultaneous events based on received pulses.
   wherein the processing system processes the substantially simultaneous events as substrate events and the non-simultaneous events as non-substrate events.

2. An assembly according to claim 1, wherein a particle absorber is provided on the substrate between and around the detectors.

3. An assembly according to claim 2, wherein the particle absorber is one of gold, bismuth, normal metal, an alloy, or a superconductor of lower superconducting energy gap than that of the superconducting quasiparticle detectors.

4. An assembly according to claim 3, wherein the particle absorber is coated with a thin reflective metal layer to preferentially reflect incident photons.

5. An assembly according to claim 1, wherein the processing system comprises respective amplifiers connected to the outputs of each detector, the outputs of the amplifiers being fed in parallel to a coincidence detecting circuit and to a processor via respective gates, the coincidence detecting circuit operating the gates to prevent pulses being supplied to the processor if the pulses are detected substantially simultaneously.

6. An assembly according to claim 1, wherein the processing system comprises means for signal amplifying connected to the outputs of each detector, the output of the means for signal amplifying being coupled to a digital signal processing unit whereby coincident pulses are rejected using digital programs.

7. A particle detector assembly comprising:
   a substrate on which is mounted at least two superconducting absorbers each having two or more superconducting quasiparticle detectors, the two or more superconducting quasiparticle detectors enhancing the detection sensitivity by maximizing the detector area; and
   a processing system connected to the detectors which distinguishes between events detected substantially simultaneously in each detector and non-simultaneous events based on received pulses.

8. A particle detector assembly according to claim 1, wherein each quasiparticle detector is a superconducting tunnel junction detector.

9. A method of characterizing events for particle detectors, the method comprising:
   detecting events with at least two superconducting quasiparticle detectors;
   distinguishing between events detected substantially simultaneously in each detector and non-simultaneous events based on received pulses; and
   processing the substantially simultaneous events as substrate events and the non-simultaneous events as non-substrate events.

* * * * *